(12) United States Patent
Kuwano (10) Patent No.: US 10,625,541 B2
(45) Date of Patent: Apr. 21, 2020

(54) PNEUMATIC TIRE

(71) Applicant: TOYO TIRE & RUBBER CO., LTD., Osaka-shi, Osaka (JP)

(72) Inventor: Shingo Kuwano, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 109 days.

(21) Appl. No.: 15/371,322

(22) Filed: Dec. 7, 2016

(65) Prior Publication Data

US 2017/0174007 A1 Jun. 22, 2017

(30) Foreign Application Priority Data

Dec. 22, 2015 (JP) .................................. 2015-249791

(51) Int. Cl.
*B60C 11/01* (2006.01)
*B60C 13/02* (2006.01)
*B60C 11/11* (2006.01)

(52) U.S. Cl.
CPC ............... *B60C 11/01* (2013.01); *B60C 11/11* (2013.01); *B60C 13/02* (2013.01); *B60C 2200/14* (2013.01)

(58) Field of Classification Search
CPC ... B60C 11/01; B60C 11/11; B60C 2011/013; B60C 13/02; B60C 2200/14
USPC ....................................................... D12/605
See application file for complete search history.

(56) References Cited

U.S. PATENT DOCUMENTS

| 6,533,007 B1* | 3/2003 | McMannis | ............... B60C 11/01 152/209.16 |
| D483,718 S * | 12/2003 | Hutz | ....................... B60C 11/01 D12/579 |
| 2009/0159166 A1* | 6/2009 | Sakamoto | ............... B60C 11/01 152/209.16 |
| 2010/0288409 A1 | 11/2010 | Ohara | |

FOREIGN PATENT DOCUMENTS

JP          2010-264962 A       11/2010

OTHER PUBLICATIONS

Office Action dated Sep. 10, 2019, issued in Japanese Patent Application No. 2015-249791 with English translation.

* cited by examiner

*Primary Examiner* — Justin R Fischer
*Assistant Examiner* — Philip N Schwartz
(74) *Attorney, Agent, or Firm* — Westerman, Hattori, Daniels & Adrian, LLP (57) ABSTRACT

A pneumatic tire includes first and second side blocks formed respectively on a side portion such that the first and second side blocks extend toward the inside in a tire radial direction from a tread shoulder portion. The first and second side blocks are arranged alternately in a tire circumferential direction. The first side block has a recessed portion formed so as to be indented with respect to a side surface. In a first region, the second side block projects outwardly in a tire width direction more than the first side block. In a second region disposed inner side than the first region, the first side block projects outwardly in the tire width direction more than the second side block. In a third region disposed inner side than the second region, the second side block projects outwardly in the tire width direction more than the first side block.

7 Claims, 9 Drawing Sheets

PNEUMATIC TIRE

CROSS-REFERENCE TO RELATED APPLICATIONS

This application claims priority of Japanese Patent Application No.: 2015-249791 filed on Dec. 22, 2015, the content of which is incorporated herein by reference.

BACKGROUND OF THE INVENTION

Technical Field

The present invention relates to a pneumatic tire.

Related Art

JP 2010-264962 A discloses a pneumatic tire which is manufactured by taking into account of rough road traveling performance. On side portions of the pneumatic tire, two kinds of blocks are alternately and repeatedly formed in a tire circumferential direction.

SUMMARY

Conventional pneumatic tires including the pneumatic tire disclosed in JP 2010-264962 A have not been sufficiently studied with respect to the effective acquisition of traction on side portions.

It is an object of the present invention to provide a pneumatic tire which can effectively acquire traction on side portions.

An aspect of the present invention provides A pneumatic tire, comprising a plurality of first side blocks and a plurality of second side blocks formed respectively on a side portion so as to extend toward an inside in a tire radial direction from a tread shoulder portion, wherein the first side block and the second side block are arranged alternately in a tire circumferential direction, the first side block has a recessed portion which is formed on an outer side of the first side block in the tire radial direction and is indented with respect to the side portion, the second side block projects toward the outside in a tire width direction more than the first side block in a first region extending in the tire circumferential direction which includes the recessed portion of the first side block, a second region where the first side block projects toward the outside in the tire width direction more than the second side block is disposed inner side in the tire radial direction than the first region, and a third region where the second side block projects toward the outside in the tire width direction more than the first side block is disposed inner side in the tire radial direction than the second region.

In the first region, the second side block projects toward the outside in the tire width direction more than the first side block. In the second region disposed inner side of the first region in the tire radial direction, the first side block projects toward the outside in the tire width direction more than the second side block. In the third region disposed inner side of the second region in the tire radial direction, the second side block projects toward the outside in the tire width direction more than the first side block. That is, the region where either one of the first side block and the second side block projects more than the other side block is provided at three positions. Further, among these regions, the setting which one of the first side block and the second side block projects more than the other block in the tire width direction is changed over alternately toward the inside from the outside in the tire radial direction. In other words, as viewed in the tire circumferential direction, the region where either one of the first side block and the second side block projects more than the other side block is alternately repeated three times in the tire radial direction.

In the first region to the third region, either one of the first side block or the second side block projects more than the other side block in the tire width direction and hence, the edge is formed whereby a traction effect can be acquired. Further, the setting which one of the first side block and the second side block projects toward the outside more than the other block in the tire width direction is changed over alternately among the first to third regions and hence, a traction effect can be acquired with certainty by the edge formed in any one of these regions. As a result, traction can be effectively acquired on the side portion.

The second side block may include: a main body; and an auxiliary portion which is disposed adjacently to the main body in the tire circumferential direction and extends in the tire radial direction, and an auxiliary stepped portion may be formed between the main body and the auxiliary portion.

An auxiliary edge extending in the tire radial direction may be formed on the second side block.

With such configurations, traction can be acquired on the side portion more effectively.

Two second side blocks arranged adjacently to each other in the tire circumferential direction may be formed so as to exhibit symmetry in the tire radial direction.

With such a configuration, a mounting posture of the tire on a vehicle body is not limited.

According to a pneumatic tire of the present invention, traction can be effectively acquired on a side portion thereof.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Next, embodiments of the present invention are described in detail with reference to attached drawings.

First Embodiment

Figure 1:
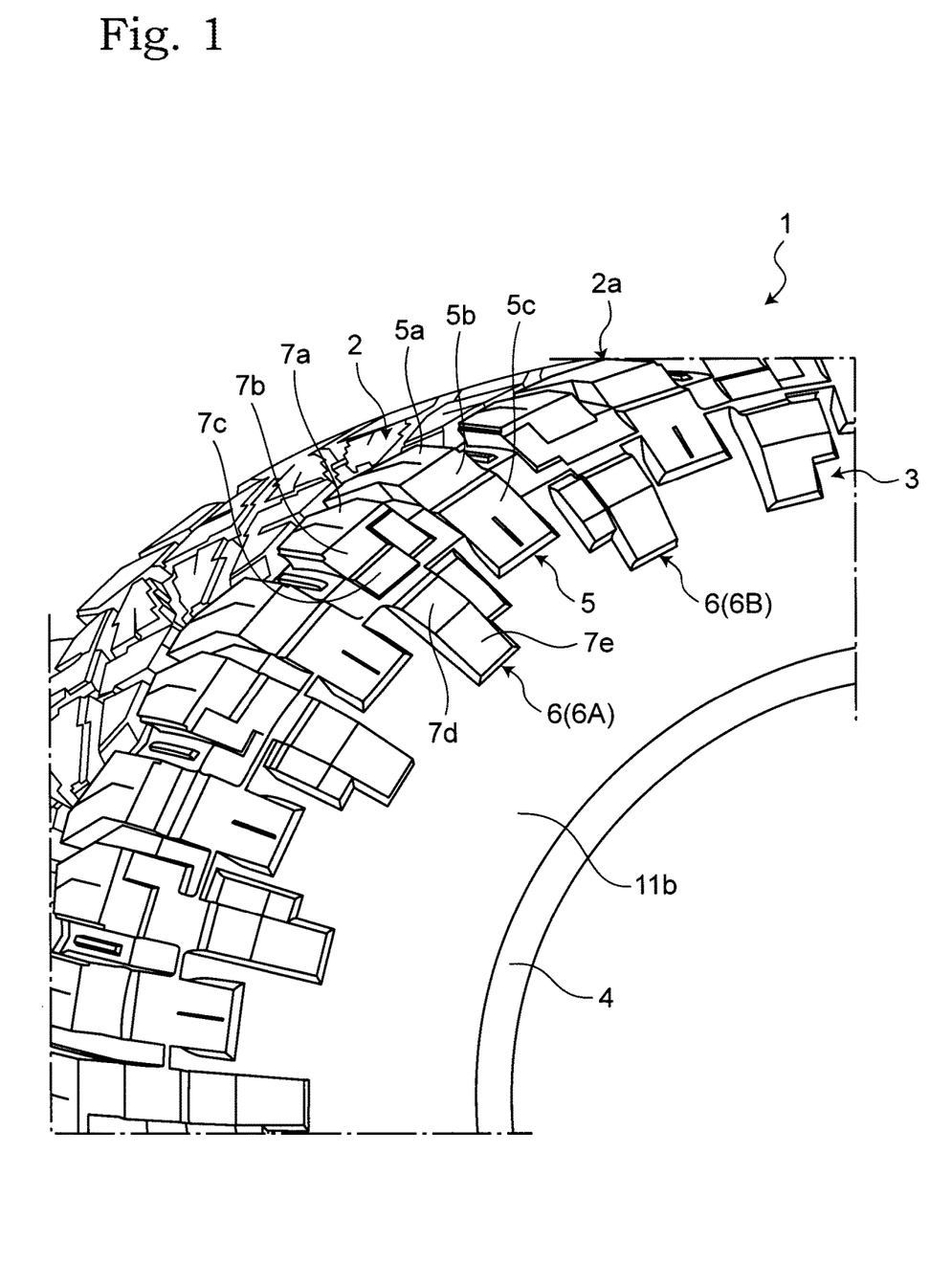
FIG. 1 is a schematic perspective view of a portion of a pneumatic tire according to a first embodiment of the present invention.

With reference to FIG. 1, a pneumatic rubber tire (hereinafter referred to as "tire") 1 according to a first embodiment of the present invention includes: a tread portion 2 on which a tread pattern is formed; and a pair of side portions 3, 3 which extends toward the inside in a tire radial direction from both edge portions in a tire width direction of the tread portion 2 (tread shoulder portions 2a, 2a). A bead portion 4 is formed on an innermost portion of each individual side portion 3 in the tire radial direction.

Figure 2:
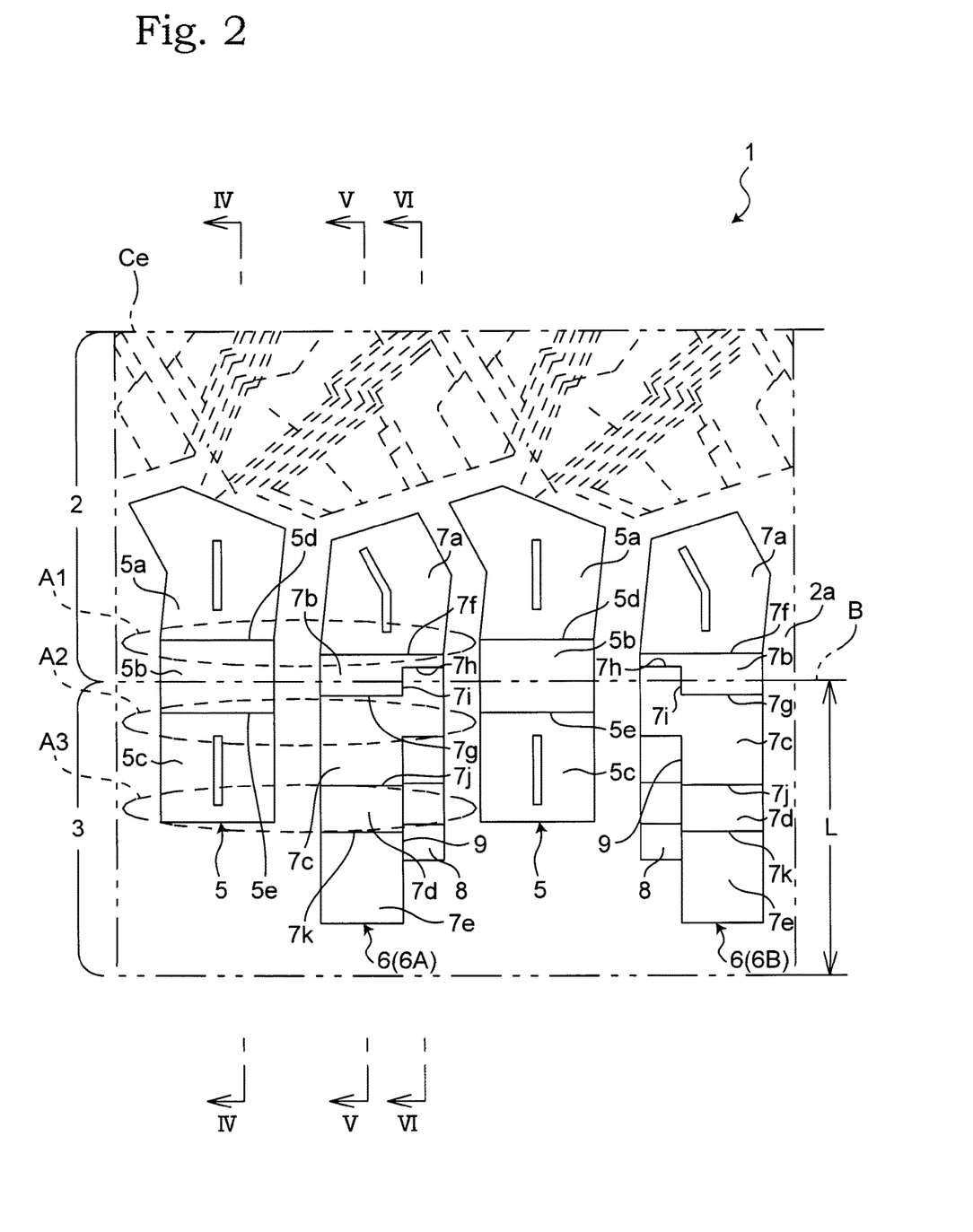
FIG. 2 is a developed view of a portion of a side portion of the pneumatic tire according to the first embodiment of the present invention.
Figure 3:
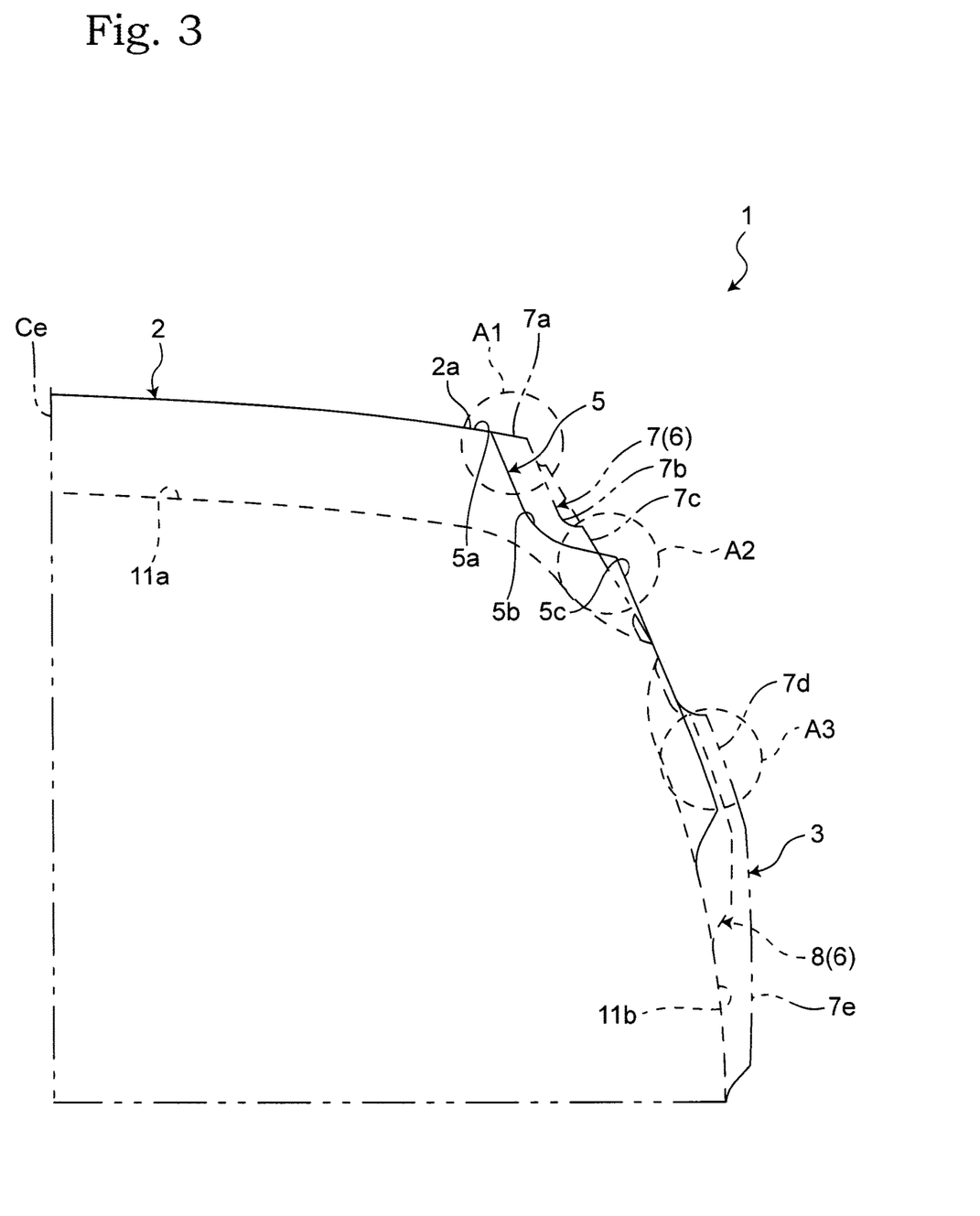
FIG. 3 is a partial cross-sectional view of the pneumatic tire shown in FIG. 2 taken along a tire radial direction.

Also with reference to FIG. 2 and FIG. 3, a plurality of first side blocks 5 are formed on each side portion 3 such that the first side blocks 5 extend toward the inside in the tire radial direction from the tread shoulder portion 2a. In the same manner, a plurality of second side blocks 6 are formed on each side portion 3 such that the second side blocks 6 extend toward the inside in the tire radial direction from the tread shoulder portion 2a. The first side block 5 and the second side block 6 are alternately arranged at intervals in the tire circumferential direction. In FIG. 2, symbol Ce indicates a center line of the tread portion 2 in the tire width direction.

Figure 4:
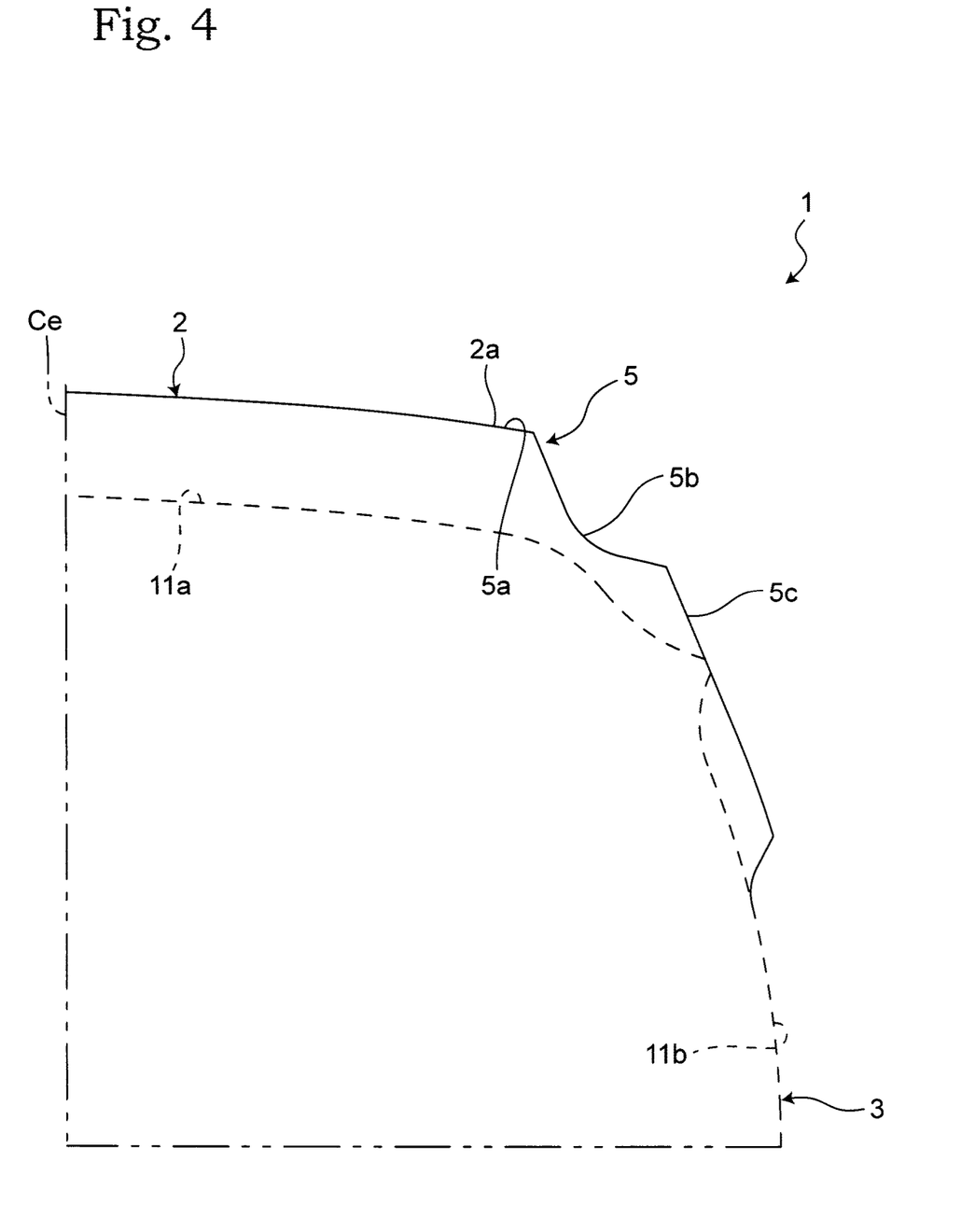
FIG. 4 is a partial cross-sectional view taken along a line IV-IV in FIG. 2.

With reference to FIG. 2 to FIG. 4, as viewed in the tire width direction, each first side block 5 has a relatively short strip shape extending approximately in the tire radial direction. The first side block 5 has a projecting portion 5a, a recessed portion 5b, and a projecting portion 5c. These portions 5a, 5b, 5c are arranged in order from a side closest to the tread shoulder portion 2a to the inside in the tire radial direction. In FIG. 3 and FIG. 4, symbol 11a indicates a tire surface covering the tread portion 2 and the side portions 3 (the tread surface and portions of side surfaces), and symbol 11b indicates the side surface. The recessed portion 5b is indented with respect to the side surface 11b.

As shown in FIG. 2, the whole projecting portion 5a of the first side block 5 is disposed on a tread shoulder portion 2a side of a boundary B between the tread shoulder portion 2a and the side portion 3. A portion of the recessed portion 5b of the first side block 5 is disposed on the tread shoulder portion 2a side and a remaining portion of the recessed portion 5b is disposed on a side portion 3 side. In other words, the recessed portion 5b of the first side block 5 is disposed such that the recessed portion 5b straddles the boundary B. The whole projecting portion 5c of the first side block 5 is disposed on the side portion 3 side of the boundary B.

In the first side block 5, a boundary 5d between the projecting portion 5a and the recessed portion 5b is set such that the boundary 5d extends approximately in the tire circumferential direction. In the first side block 5, a boundary 5e between the recessed portion 5b and the projecting portion 5c is also set such that the boundary 5e extends approximately in the tire circumferential direction.

Figure 5:
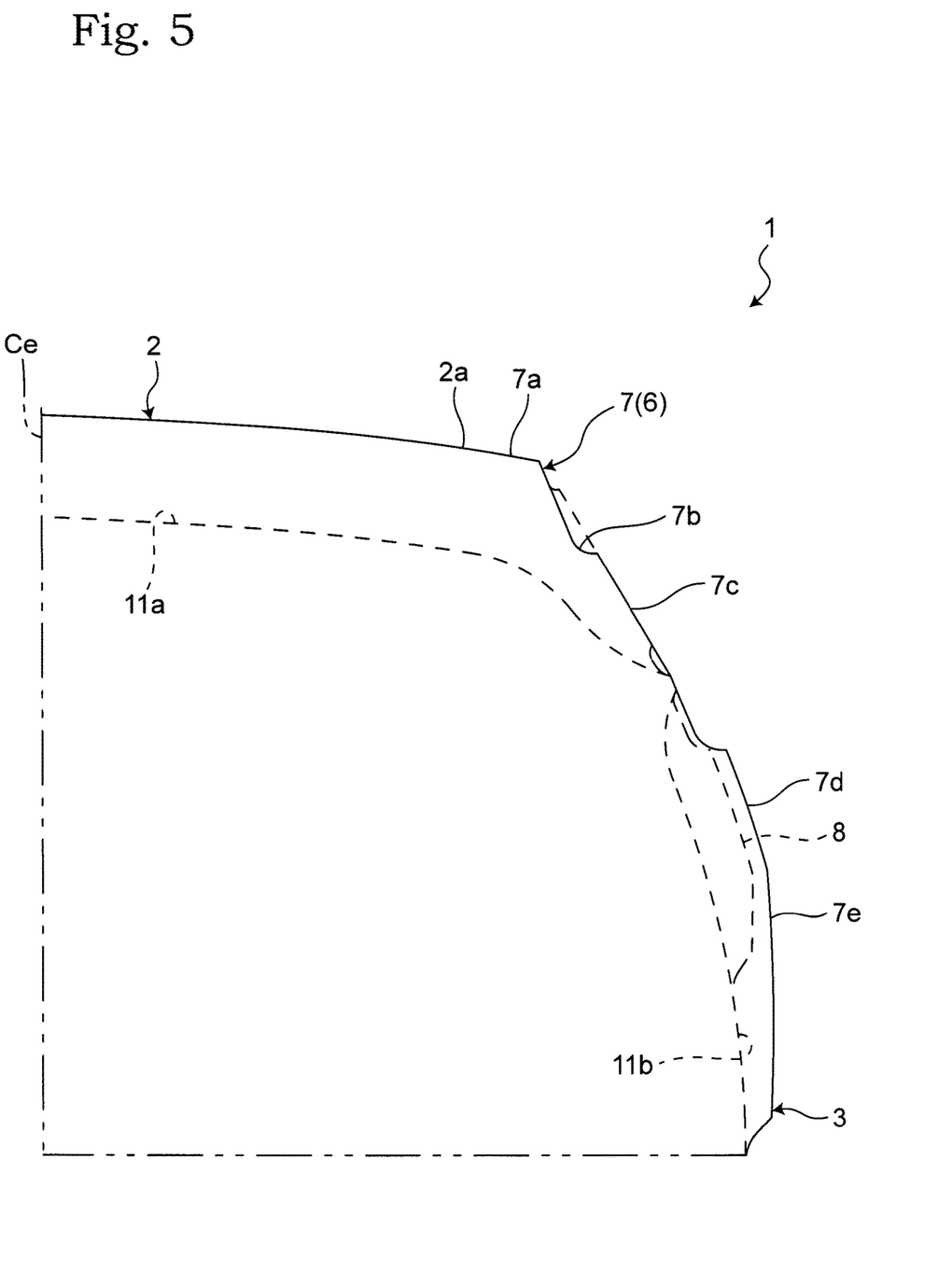
FIG. 5 is a partial cross-sectional view taken along a line V-V in FIG. 2.

With reference to FIGS. 2, 3, and 5, as viewed in the tire width direction, each second side block 6 has a relatively long strip shape extending approximately in the tire radial direction. As shown in FIG. 2, the second side block 6 includes: a main body 7; and an auxiliary portion 8 which is disposed adjacently to the main body 7 in the tire circumferential direction.

The main body 7 of the second side block 6 has a projecting portion 7a, a recessed portion 7b, a projecting portion 7c, a projecting portion 7d, and a projecting portion 7e. These portions are arranged in order from a side closest to the tread shoulder portion 2a to the inside in the tire radial direction.

As shown in FIG. 2, the whole projecting portion 7a of the main body 7 is disposed on a tread shoulder portion 2a side of the boundary B between the tread shoulder portion 2a and the side portion 3. A portion of the recessed portion 7b of the main body 7 is disposed on the tread shoulder portion 2a side, and a remaining portion of the recessed portion 7b is disposed on a side portion 3 side. A portion of the projecting portion 7c of the main body 7 is disposed on the tread shoulder portion 2a side, and most of the remaining portion of the projecting portion 7c is disposed on the side portion 3 side. The whole projecting portions 7d, 7e of the main body 7 are disposed on the side portion 3 side of the boundary B. The projecting portion 7d projects toward the outside in the tire width direction more than the projecting portion 7c. An amount that the projecting portion 7e projects toward the outside in the tire width direction is gradually decreased toward the innermost end of the main body 7 in the tire radial direction.

In the main body 7 of the second side block 6, a boundary 7f between the projecting portion 7a and the recessed portion 7b is set such that the boundary 7f extends approximately in the tire circumferential direction. In the main body 7, a boundary between the recessed portion 7b and the projecting portion 7c is formed of boundaries 7g, 7h which extend in the tire circumferential direction and a boundary 7i (auxiliary edge) which extends in the tire radial direction so as to connect these boundaries 7g, 7h with each other. In the main body 7, a boundary 7j between the projecting portion 7c and the projecting portion 7d and a boundary 7k between the projecting portion 7d and the projecting portion 7e are set such that the boundary 7j and the boundary 7k extend in the tire circumferential direction.

Figure 6:
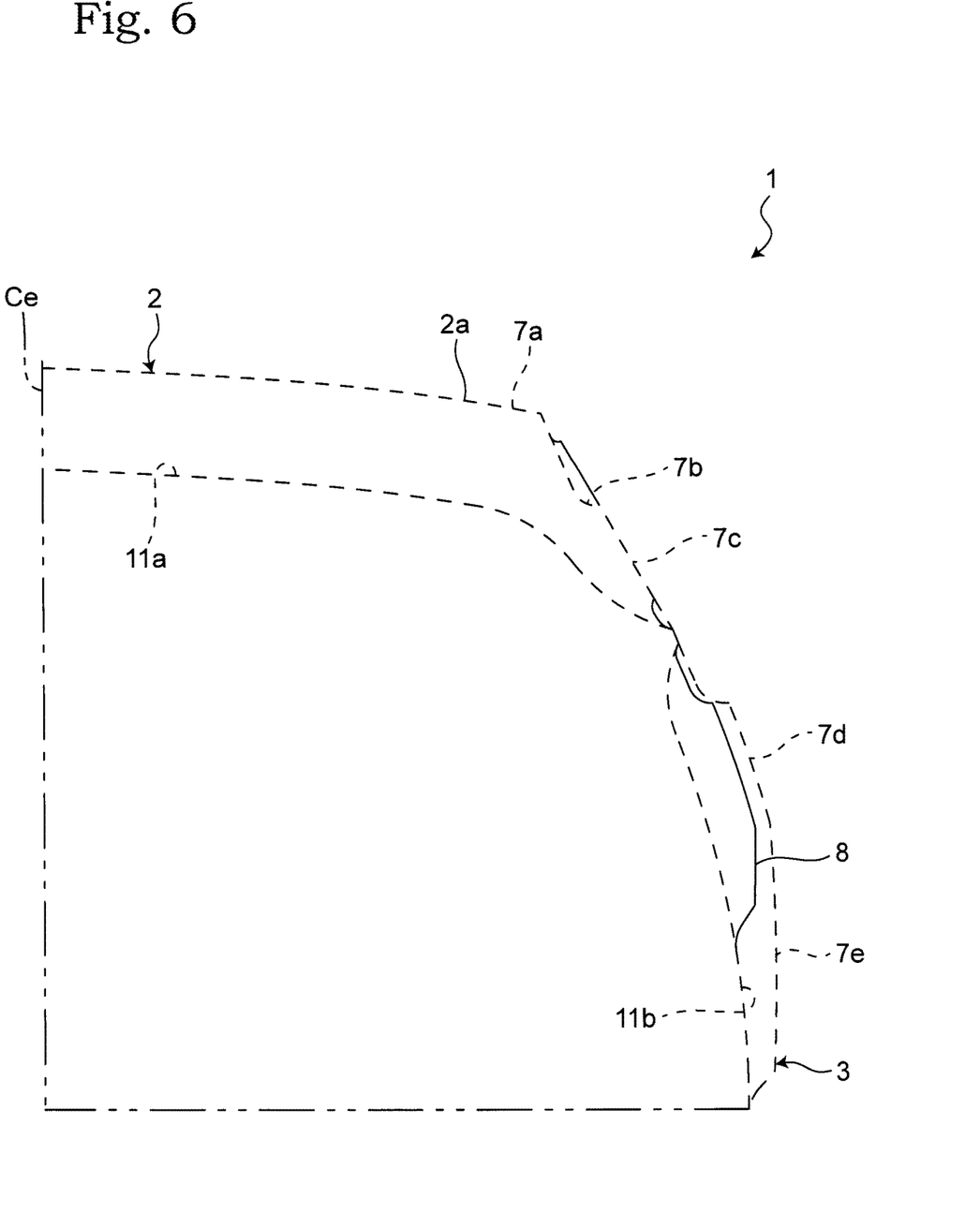
FIG. 6 is a partial cross-sectional view taken along a line VI-VI in FIG. 2.

With reference to FIG. 2, as viewed in the tire width direction, the auxiliary portion 8 of the second side block 6 has a relatively short strip shape. The auxiliary portion 8 is disposed along an outer side portion of the projecting portion 7e in the tire radial direction from an inner side portion of the projecting portion 7c of the main body 7 in the tire radial direction. As shown in FIG. 3 and FIG. 6, a projection amount of the auxiliary portion 8 in the tire width direction from the side surface 11b is set smaller than projection amounts of the projecting portions 7c, 7d, 7e of the main body 7. Accordingly, an auxiliary stepped portion 9 extending in the tire radial direction is formed between the auxiliary portion 8 and the projecting portions 7c to 7e of the main body 7.

In FIG. 2 and FIG. 3, symbol A1 indicates a region (first region) in the tire radial direction which includes the recessed portion 5b of the first side block 5. In the region A1 the main body 7 of the second side block 6, more specifically, an inner side portion of the projecting portion 7a in the tire radial direction, the whole recessed portion 7b in the tire radial direction and an outer side portion of the projecting portion 7c in the tire radial direction project toward the outside in the tire width direction more than the first side block 5. In the first region A1, an edge extending in the tire radial direction is formed by a portion of the main body 7 of the second side block 6 which projects toward the outside in the tire width direction more than the first side block 5.

In FIG. 2 and FIG. 3, a region (second region) in the tire radial direction indicated by symbol A2 is positioned on an inner side of the region A1 in the tire radial direction. In the region A2, the first side block 5, more specifically, an inner side portion of the recessed portion 5b in the tire radial direction and an outer side portion of the projecting portion 5c in the tire radial direction project toward the outside in the tire width direction more than the projecting portion 7c of the main body 7 of the second side block 6. In the second region A2, an edge extending in the tire radial direction is formed by a portion of the first side block 5 which projects toward the outside in the tire width direction more than the main body 7 of the second side block 6.

In FIG. 2 and FIG. 3, a region (third region) in the tire radial direction indicated by symbol A3 is positioned on an inner side of the region A2 in the tire radial direction. In the region A3, the main body 7 of the second side block 6, more specifically, an inner side portion of the recessed portion 7*b* in the tire radial direction projects toward the outside in the tire width direction more than the projecting portion 5*c* of the first side block 5. In the third region A3, an edge extending in the tire radial direction is formed by a portion of the main body 7 of the second side block 6 which projects toward the outside in the tire width direction more than the first side block 5.

Among the regions A1 to A3, the setting which one of the first side block 5 and the main body 7 of the second side block 6 projects more than the other block in the tire width direction is changed over alternately toward the inside from the outside in the tire radial direction. In other words, as viewed in the tire circumferential direction, the region where either one of the first side block 5 and the main body 7 of the second side block 6 projects more than the other side block is alternately repeated three times in the tire radial direction.

In the regions A1 to A3, either one of the first side block 5 and the second side block 6 projects toward the outside in the tire width direction more than the other side block and hence, the edge is formed whereby a traction effect can be acquired. Further, the setting which one of the first side block 5 and the second side block 6 projects more toward the outside in the tire width direction is changed over alternately among the regions A1 to A3 and hence, a traction effect can be acquired with certainty by the edge in any one of these regions A1 to A3. As a result, traction can be effectively acquired on the side portion 3.

In the regions A1 to A3, a difference in projection amount in the tire width direction between the first side block 5 and the main body 7 of the second side block 6 is preferably set to a value which falls within a range from 5 mm to 15 mm inclusive and, is particularly preferably set to a value which falls within a range from 5 mm to 10 mm inclusive. When the difference in projection amount is excessively small, sufficient traction cannot be acquired. On the other hand, when the difference in projection amount is excessively large, ground contact areas of the first side block 5 and the second side block 6 become excessively small.

In the region A1, a difference in projection amount in the tire width direction between the first side block 5 and the main body 7 of the second side block 6 is preferably set to 20% or more and 100% or less, and particularly preferably set to 50% or more and 100% or less, of a difference in projection amount between recessed portions and projecting portions of the tread shoulder portion 2*a*. When the difference in projection amount in the region A1 is excessively large compared to the difference in projection amount in the tread shoulder portion 2*a*, the recessed portions and the projecting portions of the tread shoulder portion 2*a* do not effectively exert traction.

A distance in the tire circumferential direction between the first side block 5 and the second side block 6 which are disposed adjacently to each other is preferably set to 20% or more and 50% or less, particularly to 25% or more and 35% or less of a distance L from the boundary B to an inner distal end in the tire radial direction of the second side block 6 (see FIG. 2). When the distance in the tire circumferential direction between the first side block 5 and the second side block 6 is excessively large or excessively small, followability of the side portion 3 having the first and second side blocks 5, 6 to a rocky road is lowered.

Figure 7:
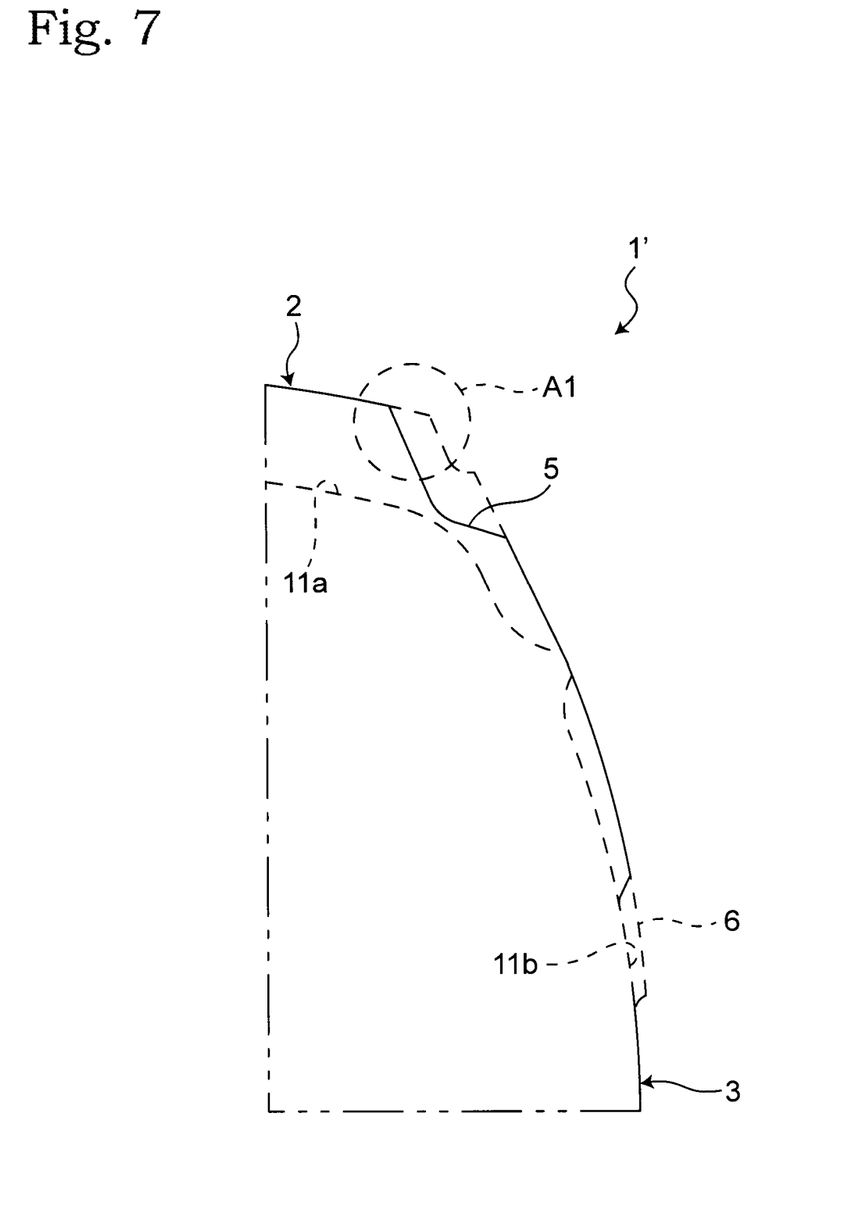
FIG. 7 is a partial cross-sectional view of a pneumatic tire according to a comparative example taken along a tire radial direction.
Figure 8:
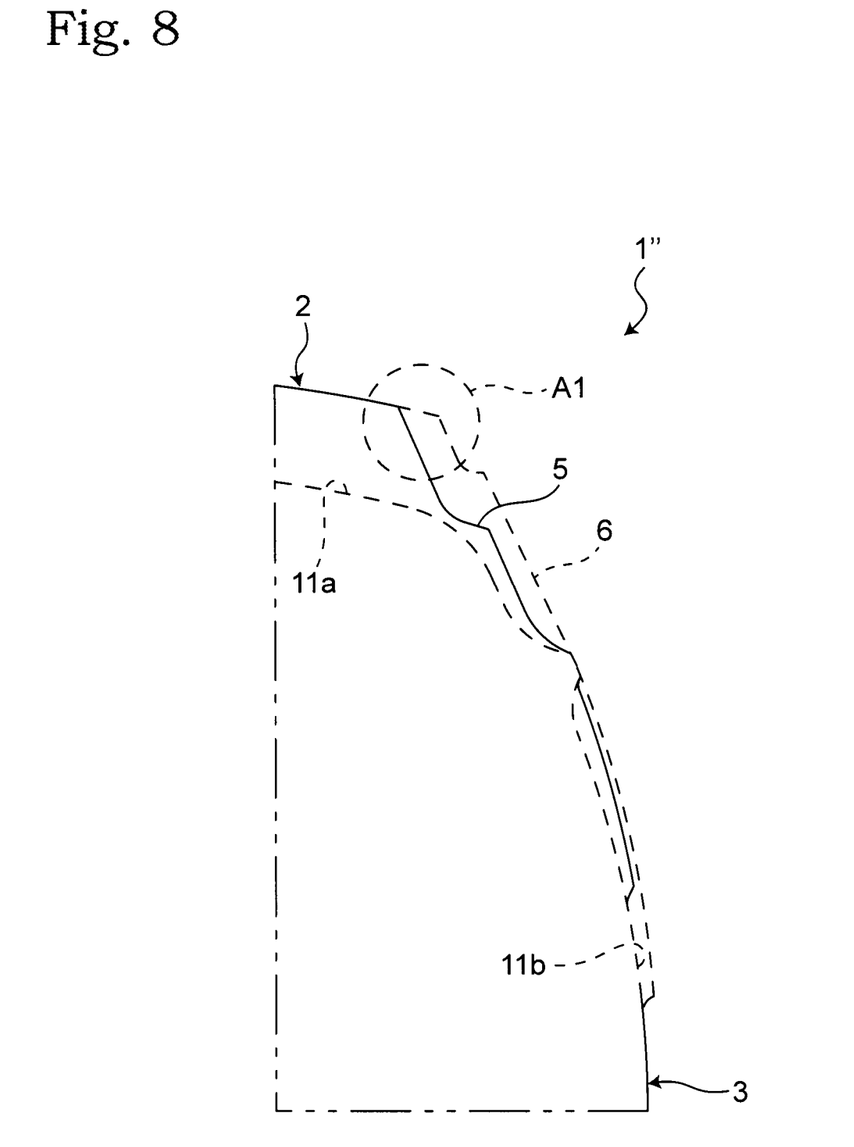
FIG. 8 is a partial cross-sectional view of a pneumatic tire according to another comparative example taken along a tire radial direction.

FIGS. 7 and 8 respectively shows a tire 1', 1" of comparative examples. In the tires 1', 1", a second side block 6 projects toward the outside in the tire width direction more than a first side block 5 in a region A1. However, the tires 1', 1" do not have the configurations which correspond to the regions A2, A3 in the above-mentioned embodiment. That is, in the tires 1', 1", instead of repeating the region where either one of a first side block 5 and a second side block 6 projects more than the other side block plural times, only a single region is formed. With such a configuration, when an edge in a region A1 does not function, traction cannot be acquired on a side portion 3. On the other hand, in this embodiment, three regions A1 to A3 where either one of the first side block 5 or the second side block 6 projects more than the other side block are alternately disposed in the tire radial direction. Accordingly, even when an edge in one of these regions A1 to A3 does not function, there is a high possibility that edges in other two regions function and hence, traction can be acquired on the side portions 3 with more certainty.

The second side block 6 has the main body 7 and the auxiliary portion 8, and the auxiliary stepped portion 9 extending in the tire radial direction is formed between the auxiliary portion 8 and the projecting portions 7*c* to 7*e* of the main body 7. Also with the provision of the auxiliary stepped portion 9, traction can be acquired by the side portions 3.

In the main body 7 of the second side block 6, a boundary 7*i* (auxiliary edge) extending in the tire radial direction is formed between the recessed portion 7*b* and the projecting portion 7*c*. Also with the provision of the auxiliary edge, traction can be acquired on the side portion 3.

In this embodiment, in the first side block 5, both boundaries 5*d*, 5*e* extend in the tire circumferential direction so that the first side block 5 has a relatively simple shape. On the other hand, the second side block 6 has the main body 7 and the auxiliary portion 8 and hence, the boundary between the recessed portion 7*b* and the projecting portion 7*c* of the main body 7 is not formed of only the boundary extending in the tire circumferential direction and also includes the boundary 7*i* extending in the tire radial direction. Accordingly, the second side block 6 has a relatively complicated shape. By repeatedly arranging the first side block 5 having a relatively simple shape and the second side block 6 having a relatively complicated shape in the tire circumferential direction, the tire can acquire high design property which attracts the attention of a viewer.

With reference to FIG. 2, as indicated by symbols 6A, 6B in FIG. 2, in this embodiment, two second side blocks 6 arranged adjacently to each other in the tire circumferential direction are formed so as to exhibit symmetry in the tire radial direction. More specifically, these second side blocks 6A, 6B are arranged such that portions of the second side blocks 6A, 6B excluding the projecting portions 7*a* of the main bodies 7, that is, the recessed portions 7*b*, the projecting portions 7*c* to 7*e* and the auxiliary portions 8 exhibit symmetry in the tire radial direction. By arranging the second side blocks 6 so as to exhibit symmetry, even when a mounting posture of the tire 1 on a vehicle body changes, the tire 1 can effectively acquire traction on the side portions 3.

Second Embodiment

Figure 9:
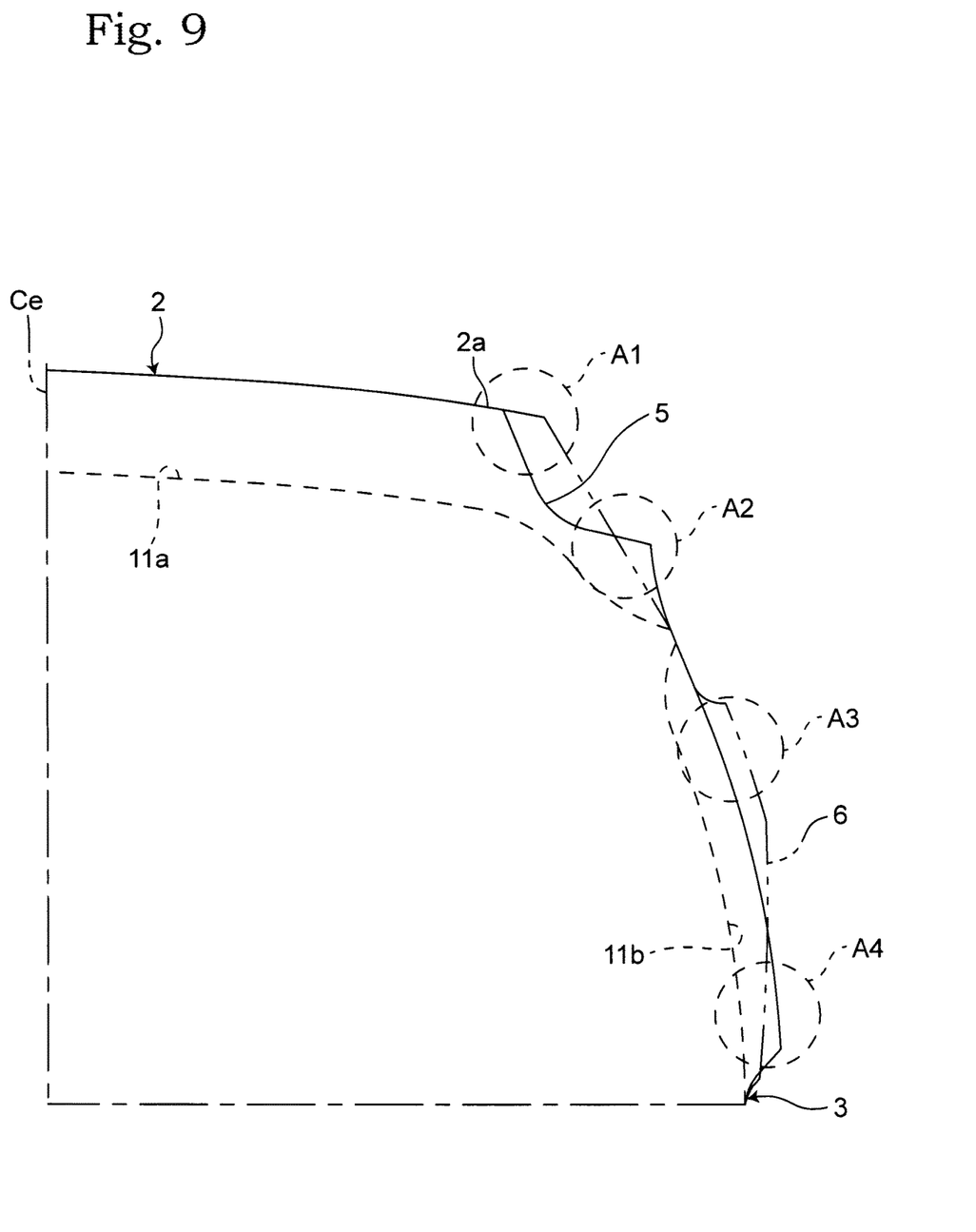
FIG. 9 is a partial cross-sectional view of a pneumatic tire according to a second embodiment of the present invention taken along a tire radial direction.

In a second embodiment of the present invention shown in FIG. 9, in a region A4 disposed inner side of a region A3 in the tire radial direction, a first side block 5 projects in the tire width direction more than a second side block 6. As in the case of this embodiment, a region where either one of the first side block and the second side block projects more in the tire width direction may be formed at four or more positions in the tire radial direction. By increasing the number of such regions, a tire can effectively acquire traction on side portions 3 with more certainty.

What is claimed is:

1. A pneumatic tire, comprising a plurality of first side blocks and a plurality of second side blocks formed respectively on a side portion so as to extend toward an inside in a tire radial direction from a tread shoulder portion, wherein
   the first side block and the second side block are arranged alternately in a tire circumferential direction,
   the first side block has a recessed portion which is formed on an outer side of the first side block in the tire radial direction and is indented with respect to the side portion,
   the second side block projects toward the outside in a tire width direction more than the first side block in a first region extending in the tire circumferential direction which includes the recessed portion of the first side block,
   a second region where the first side block projects toward the outside in the tire width direction more than the second side block is disposed inner side in the tire radial direction than the first region,
   a third region disposed on an inner side of the second region in the tire radial direction, the third region comprises a projection portion of the first side block and a projection portion of second side block, and the second side block projects toward the outside in the tire width direction more than the first side block,
   a fourth region disposed on an inner side of the third region in the tire radial direction, in the fourth region the first side block projects in the tire width direction more than the second side block, the second side block comprises a main body; and further consists of a single auxiliary portion, the single auxiliary portion is disposed on only one side portion of the main body in the tire circumferential direction and extends in the tire radial direction, and an auxiliary stepped portion is formed between the main body and the auxiliary portion.

2. The pneumatic tire according to claim 1, wherein the second side block includes: a main body; and an auxiliary portion which is disposed adjacently to the main body in the tire circumferential direction and extends in the tire radial direction, and an auxiliary stepped portion is formed between the main body and the auxiliary portion.

3. The pneumatic tire according to claim 1, wherein an auxiliary edge extending in the tire radial direction is formed on the second side block.

4. The pneumatic tire according to claim 1, wherein two second side blocks arranged adjacently to each other in the tire circumferential direction are formed so as to exhibit symmetry in the tire radial direction.

5. The pneumatic tire according to claim 1, wherein
   the second side block includes, a main body, and a single auxiliary portion which is disposed on one of side portion of the main body in the tire circumferential direction,
   an auxiliary portion of a first second side block and an auxiliary portion of another second side block are arranged adjacently to each other in the tire circumferential direction and are arranged so as to exhibit symmetry with respect to the tire radial direction.

6. The pneumatic tire according to claim 1, wherein in the first region a difference in projection amount in the tire width direction between the second side block and the first block is set to 20% or more and 100% or less.

7. The pneumatic tire according to claim 6, wherein in the first region a difference in projection amount in the tire width direction between the second side block and the first block is set to 50% or more and 100% or less.

* * * * *